(12) United States Patent
Morris

(10) Patent No.: US 8,813,783 B2
(45) Date of Patent: Aug. 26, 2014

(54) VALVE WITH CANTED SEALS

(75) Inventor: John Michael Morris, Auburn, WA (US)

(73) Assignee: Norgren GT Development Corporation, Auburn, WA (US)

( * ) Notice: Subject to any disclaimer, the term of this patent is extended or adjusted under 35 U.S.C. 154(b) by 384 days.

(21) Appl. No.: 13/246,988

(22) Filed: Sep. 28, 2011

(65) Prior Publication Data

US 2013/0075641 A1 Mar. 28, 2013

(51) Int. Cl.
*F16K 11/085* (2006.01)

(52) U.S. Cl.
CPC .................................. *F16K 11/0856* (2013.01)
USPC .................................. 137/625.19; 137/625.18

(58) Field of Classification Search
USPC .......... 137/625, 625.18, 625.19, 625.47, 594, 137/595; 251/288
See application file for complete search history.

(56) References Cited

U.S. PATENT DOCUMENTS

| 263,264 | A | * | 8/1882 | Walsh | 137/625.19 |
| 605,991 | A | * | 6/1898 | Bleier | 422/92 |
| 876,724 | A | * | 1/1908 | Meldau | 137/212 |
| 1,270,722 | A | * | 6/1918 | Gillette | 137/595 |
| 1,830,594 | A | * | 11/1931 | Crowe | 137/625.19 |
| 2,621,886 | A | * | 12/1952 | Mueller | 137/625.47 |
| 2,766,771 | A | * | 10/1956 | Wenzel | 137/595 |
| 2,918,935 | A | * | 12/1959 | Ohls | 137/553 |
| 3,044,491 | A | * | 7/1962 | Sangster | 137/625.18 |
| 3,937,253 | A | * | 2/1976 | Lilja | 137/625.18 |
| 4,355,659 | A | * | 10/1982 | Kelchner | 137/625.19 |
| 4,880,032 | A | * | 11/1989 | Doutt | 137/625.19 |
| 5,293,685 | A | * | 3/1994 | Meyer et al. | 29/890.124 |
| 5,437,304 | A | * | 8/1995 | Delcroix | 137/595 |
| 6,308,739 | B1 | * | 10/2001 | Barbuto et al. | 137/625.19 |

* cited by examiner

*Primary Examiner* — John Rivell
*Assistant Examiner* — Umashankar Venkatesan
(74) *Attorney, Agent, or Firm* — The Ollila Law Group LLC

(57) ABSTRACT

A valve (103) is provided. The valve (103) comprises a housing (104) defining an internal bore (209) and a plurality of fluid ports (107a, 107b, 108a, 108b). The valve (103) further comprises a rotatable spool (210) positioned within the internal bore (209) and rotatable about a longitudinal axis (X-X). A first canted seal (217) is provided that is positioned on the rotatable spool (210) at an angle ($\theta$) with respect to the longitudinal axis (X-X). A second canted seal (218) is also provided that is positioned on the rotatable spool (210) at an angle ($\alpha$) with respect to the longitudinal axis (X-X).

18 Claims, 4 Drawing Sheets

VALVE WITH CANTED SEALS

TECHNICAL FIELD

The embodiments described below relate to, valves, and more particularly, to a valve with one or more canted seals.

BACKGROUND OF THE INVENTION

Fluid control valves are used in a wide variety of industries in order to control the delivery of a fluid supply. The fluid may comprise a liquid, a gas, or a combination thereof. In some situations, the fluid may include suspended particulates. While it is often suitable for a valve to control a single fluid flow, in other situations, multiple fluid flows need to be controlled, and at times, controlled simultaneously. In such situations, complex electrically-actuated or fluid-actuated valves are often employed. While these types of valves have advantages, in some situations, it is desirable simply to provide an on/off valve that can be manually actuated and remain in a given actuated state for extended periods of time without requiring energy or a pilot pressure.

Such a situation exists in the motor vehicle industry where a user may need to control the flow of heated air into the cabin of a vehicle. One of the most common ways of heating vehicles and, heavy duty vehicles in particular, is to use hot engine coolant that flows from an engine's cooling circuit to a heater, which can then control the interior temperature of the passenger compartment (cab) of the vehicle. A secondary fluid circuit can be used to provide heat to an optional sleeper unit that may be positioned behind the main cab of heavy duty vehicles. Therefore, during colder seasons, heat generated from the engine can be transferred to the main cab and/or the sleeper unit to warm the area.

One issue faced with the above-described configuration is the ability to shut the system off sufficiently to isolate the heater core from the high temperature engine coolant. This may be desired during warmer seasons where additional heat is not required in the main cab. The heat to the main cab may not be required for a period of months. Therefore, any type of fluid isolation that would require a continuous supply of power and/or pilot pressure is generally undesirable. The isolation may also be desired to perform maintenance on a component of the heating system. In some prior art systems, a complex manifold assembly has been used to shut off the coolant's flow from the engine as well as to the heater core. The prior art manifolds typically require numerous ¼ turn ball valves resulting in a cumbersome and complex configuration. The prior art manifold assembly cannot be easily shut down during the warmer months or for maintenance.

There exists a need in the art for a simplified valve that is capable of simultaneously opening and closing fluid flow through two or more sets of ports. The embodiments described below overcome these and other problems and an advance in the art is achieved. The embodiments described below provide a valve that utilizes canted sealing members. The canted sealing members are positioned upon a rotatable spool that is actuated in order to open or close communication between two or more fluid circuits.

SUMMARY OF THE INVENTION

A valve is provided according to an embodiment. The valve comprises a housing defining an internal bore and a plurality of fluid ports. According to an embodiment, the valve further comprises a rotatable spool positioned within the internal bore and rotatable about a longitudinal axis. According to an embodiment, a first canted seal is positioned on the rotatable spool at an angle with respect to the longitudinal axis. According to an embodiment, a second canted seal is positioned on the rotatable spool at an angle with respect to the longitudinal axis.

A method for forming a valve is provided according to an embodiment. The method comprises a step of positioning a first canted seal on a spool at an angle with respect to a longitudinal axis of the spool. According to an embodiment, the method further comprises a step of positioning a second canted seal on the spool at an angle with respect to the longitudinal axis of the spool. According to an embodiment, the method further comprises a step of positioning the spool in a housing such that the spool can rotate within the housing about the longitudinal axis to selectively control a fluid flow through a plurality of fluid ports using the first and second canted seals.

A method for controlling a fluid through a valve is provided according to an embodiment. According to an embodiment, the method comprises a step of rotating a rotatable spool about a longitudinal axis to a first position to selectively control a fluid flow through a first and a second fluid port with a first canted seal positioned on the rotatable spool at an angle with respect to the longitudinal axis and to selectively control a fluid flow through a third fluid port and a fourth fluid port with a second canted seal positioned on the rotatable spool at an angle with respect to the longitudinal axis.

Aspects

According to an aspect, a valve comprises:
  a housing defining an internal bore and a plurality of fluid ports;
  a rotatable spool positioned within the internal bore and rotatable about a longitudinal axis;
  a first canted seal positioned on the rotatable spool at an angle with respect to the longitudinal axis; and
  a second canted seal positioned on the rotatable spool at an angle with respect to the longitudinal axis.

Preferably, the first canted seal is positioned to selectively seal a first fluid port off from a second fluid port and wherein the second canted seal is positioned to selectively seal a third fluid port off from a fourth fluid port.

Preferably, the internal bore comprises three or more cross-sectional diameters and wherein the entire first canted seal is positioned within a portion of the internal bore comprising a single cross-sectional diameter when the first fluid port is sealed off from the second fluid port and wherein the entire second canted seal is positioned within a portion of the internal bore comprising a single cross-sectional diameter when the third fluid port is sealed off from the fourth fluid port.

Preferably, the angle of the first canted seal is between approximately 5° and approximately 55°.

Preferably, the angle of the second canted seal is between approximately 5° and approximately 55°.

Preferably, the valve further comprises a handle coupled to a portion of the rotatable spool extending from the housing.

Preferably, the handle comprises one or more tabs sized and positioned to contact a handle stop extending from the housing when the rotatable spool is in one or more predetermined positions.

Preferably, the valve further comprises a first fluid chamber in fluid communication with a first fluid port and a second fluid port when the rotatable spool is in a first position.

Preferably, the valve further comprises a second fluid chamber in fluid communication with a third fluid port and a fourth fluid port when the rotatable spool is in a first position.

According to another aspect, a method for forming a valve comprises steps of:

positioning a first canted seal on a spool at an angle with respect to a longitudinal axis of the spool;

positioning a second canted seal on the spool at an angle with respect to the longitudinal axis of the spool; and positioning the spool in a housing such that the spool can rotate within the housing about the longitudinal axis to selectively control a fluid flow through a plurality of fluid ports using the first and second canted seals.

Preferably, the step of positioning the spool comprises positioning the spool to selectively seal a first fluid port off from a second fluid port with the first canted seal and selectively seal a third fluid port off from a fourth fluid port with the second canted seal.

Preferably, the step of positioning the spool comprises inserting the spool into an internal bore formed by the housing and comprising three or more cross-sectional diameters.

Preferably, transitional sections between the cross-sectional diameters at least partially round off an intersection between a port of the plurality of ports and the internal bore.

Preferably, the angle of the first canted seal is between approximately 5° and approximately 55°.

Preferably, the angle of the second canted seal is between approximately 5° and approximately 55°.

Preferably, the method further comprises a step of coupling a handle to a portion of the spool that extends from the housing.

Preferably, the method further comprises a step of forming one or more tabs on the handle that are sized and positioned to contact a handle stop extending from the housing when the spool is in one more predetermined positions.

According to another aspect, a method for controlling a fluid through a valve comprises a step of:

rotating a rotatable spool about a longitudinal axis to a first position to selectively control a fluid flow through a first and a second fluid port with a first canted seal positioned on the rotatable spool at an angle with respect to the longitudinal axis and to selectively control a fluid flow through a third fluid port and a fourth fluid port with a second canted seal positioned on the rotatable spool at an angle with respect to the longitudinal axis.

Preferably, the first canted seal opens a fluid flow path between the first and second fluid ports when the rotatable spool is in the first position.

Preferably, the method further comprises a step of rotating the rotatable spool to a second position to close the fluid flow path between the first and second fluid ports.

Preferably, the second canted seal opens a fluid flow path between the third and fourth fluid ports when the rotatable spool is in the first position.

Preferably, the method further comprises a step of rotating the rotatable spool to a second position to close the fluid flow path between the third fluid and fourth fluid ports.

DETAILED DESCRIPTION OF THE INVENTION

FIGS. 1-4 and the following description depict specific examples to teach those skilled in the art how to make and use the best mode of embodiments of a valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the valve. As a result, the embodiments described below are not limited to the specific examples described below, but only by the claims and their equivalents.

Figure 1:
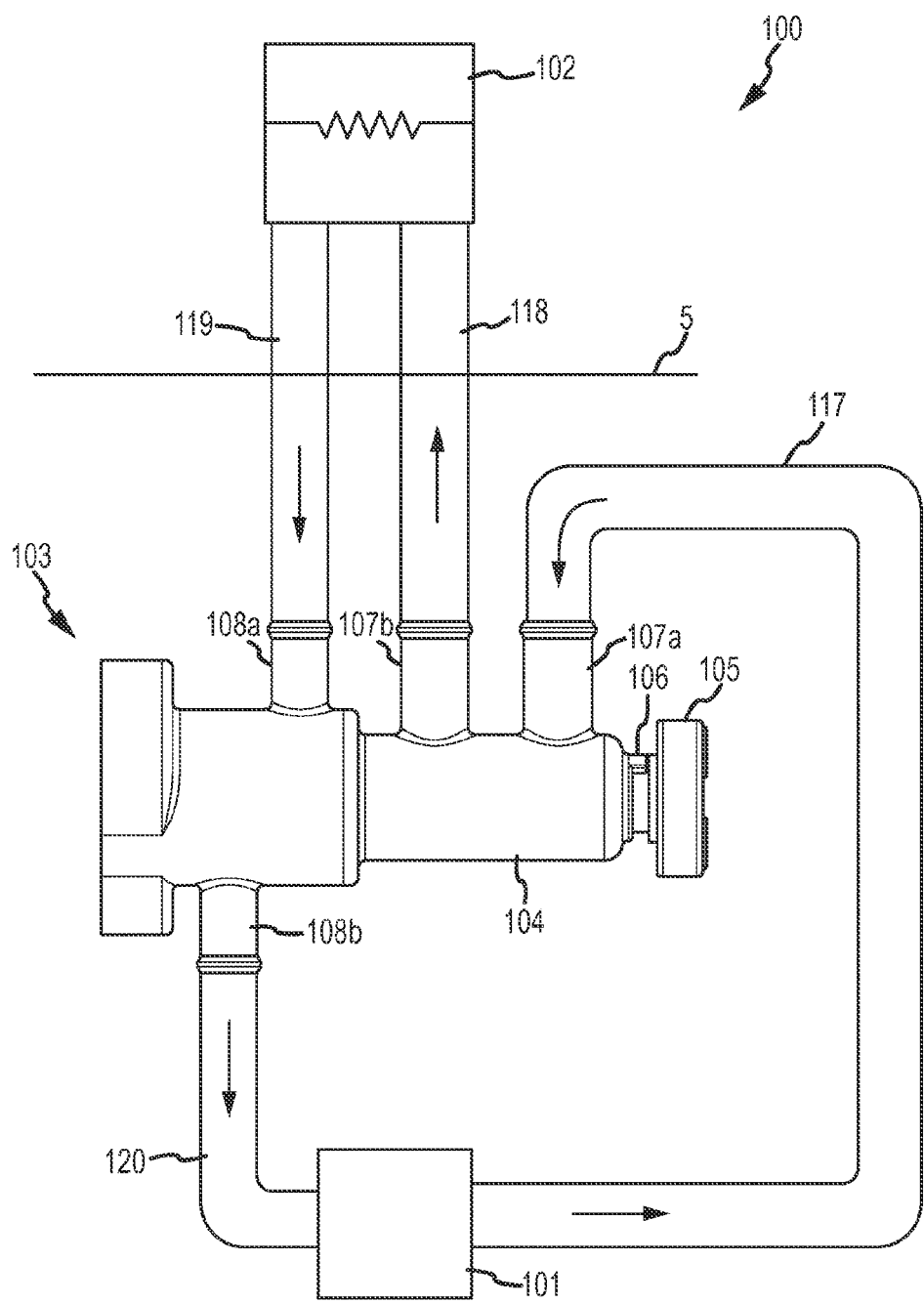
FIG. 1 shows a valve incorporated into a heating system according to an embodiment.

FIG. 1 shows a schematic of a vehicle heating system 100 according to an embodiment. The heating system 100 comprises an engine cooling circuit 101, a heater 102, and a valve 103 controlling a fluid supply between the heater 102 and the engine cooling circuit 101. The fluid being controlled by the valve 103 may comprise engine coolant, for example. Those skilled in the art can readily appreciate that the engine coolant is heated by the engine's heat and can be delivered to the heater 102 via the valve 103. The heater 102 may comprise a heater for a vehicle's cab, for example. Alternatively, the heater 102 may comprise a heater for a sleeper unit of a heavy duty vehicle. According to an embodiment, a second heater and a second valve may be fluidly coupled to the engine cooling circuit 101 in order to provide an auxiliary heat, such as for a vehicle's sleeper unit wherein the heater and valve shown would be for the vehicle's main cab. As can be appreciated, a fan (not shown) or the like may be provided to deliver air heated by the heater 102 to the cab or sleeper unit of a vehicle as is generally known in the art. According to an embodiment, the heater 102 may be positioned within a vehicle's cab or sleeper unit while the remaining components of the heating system 100 can be positioned outside the vehicle's firewall 5. Alternatively, all of the components may be located outside the vehicle's firewall 5 and a fan can blow the heated air into the vehicle's cab or sleeper unit.

According to an embodiment, the valve 103 comprises a housing 104, a rotatable handle 105, and a handle stop 106 formed on and extending from the housing 104. The handle stop 106 cooperates with a corresponding tab formed on the handle (See FIG. 2) to limit the rotation of the handle 105. The valve 103 further comprises a first set of fluid ports 107a, 107b and a second set of fluid ports 108a, 108b. It should be appreciated that while the embodiment shown only comprises two sets of fluid ports (four ports total), other embodiments may include more than two sets of fluid ports.

According to the embodiment shown, the valve 103 is in fluid communication with the engine cooling circuit 101 via fluid conduits 117 and 120 and in fluid communication with the heater 102 via the fluid conduits 118 and 119. In the embodiment shown, the valve 103 is supplied with fluid from the engine cooling circuit 101 using the fluid conduit 117, which is coupled to the first fluid port 107a. The first set of ports comprising the first and second fluid ports 107a, 107b are selectively brought into fluid communication with one another based on the rotational position of the handle 105. When the two fluid ports 107a, 107b are brought into fluid communication with one another, fluid from the first fluid port 107a flows to the second fluid port 107b and towards the heater 102 by way of the fluid conduit 118, which is shown coupled to the second fluid port 107b and to the heater 102. As can be appreciated, the relatively hot engine coolant can be supplied to the heater 102 in order to provide heated air to a vehicle cab or alternatively, a vehicle's sleeper unit, for example. The fluid can flow from the heater 102 back to the valve 103 using a fluid conduit 119, which is shown coupled to the heater 102 and the third fluid port 108a. When the valve 103 is actuated to open a fluid communication path between the second set of ports comprising the third fluid port 108a and a fourth fluid port 108b, the fluid can flow from the third fluid port 108a, to the fourth fluid port 108b and back to the engine cooling circuit 101 via the fluid conduit 120. As can be appreciated, the fluid may be pressurized in order to allow the fluid to flow through the heating system 100 as described. Further, the system 100 may include one or more fluid pumps (not shown), which may aid in the fluid's travel. Those skilled in the art will readily recognize that the schematic shown in FIG. 1 has omitted numerous components and is only intended to illustrate a simplified version of the system. Namely, FIG. 1 is intended to illustrate the general positioning of the valve 103 with respect to the various fluid conduits. Therefore, those skilled in the art will recognize that other components will typically be incorporated into the heating system 100, but do not comprise a portion of the presently claimed embodiment.

According to an embodiment, the valve 103 can be actuated to selectively control the fluid communication path between the first set of ports 107a, 107b and the second set of ports 108a, 108b substantially simultaneously. This can allow fluid on the engine side of the valve 103 to be substantially isolated from fluid on the heater side of the valve 103. In other words, the fluid conduits 117, 120 communicating between the valve 103 and the engine cooling circuit 101 can be substantially isolated from the fluid conduits 118, 119 communicating between the valve 103 and the heater 102. This isolation may be useful during maintenance and other shutdown times. For example, as explained above, during warmer seasons, it may be desirable to shut the heating system down and prevent the engine coolant from being delivered to the heater 102.

Figure 2:
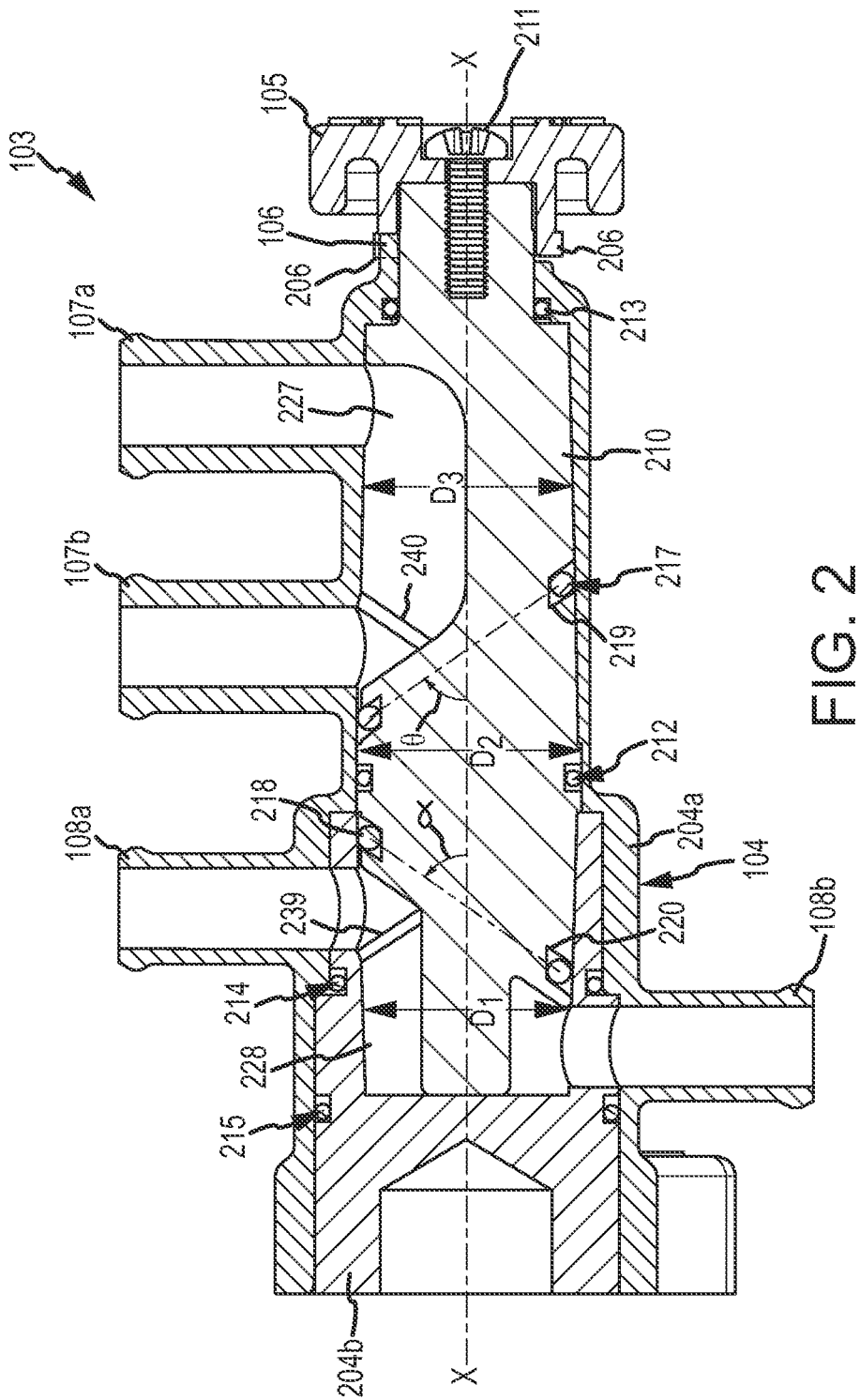
FIG. 2 shows a cross-sectional view of the valve in a first position according to an embodiment.

FIG. 2 shows a cross-sectional view of the valve 103 according to an embodiment. As shown in FIG. 2, the housing 104 comprises a first housing portion 204a and a second housing portion 204b. It should be appreciated that in other embodiments, the housing 104 may comprise more than two portions. The first and second housing portions 204a, 204b may be coupled according to well-known techniques, such as adhesives, brazing, bonding, etc. Alternatively, the housing portions 204a, 204b may be held together in a friction-fit manner. The particular method used to hold the first and second housing portions 204a, 204b with respect to one another is not important for purposes of the present embodiment.

Now visible in FIG. 2 is a rotatable spool 210 positioned within the housing 104. More specifically, the rotatable spool 210 can be positioned within an internal bore 209 formed by the housing 104. The internal bore 209 can optionally comprise two or more cross-sectional diameters that can be separated by transition sections. For example, in the embodiment shown in FIG. 2, the internal bore 209 comprises a first cross-sectional diameter $D_1$ and a second cross-sectional diameter $D_2$. According to the embodiment shown, the internal bore 209 can include a first transitional section 239 that increases in size from the first cross-sectional diameter $D_1$ to the second cross-sectional diameter $D_2$ from left to right. According to an embodiment, the internal bore 209 can further include a second transitional section 240 that decreases in size from the second cross-sectional diameter $D_2$ to a third cross-sectional diameter $D_3$ from left to right. According to one embodiment, the first cross-sectional diameter $D_1$ is substantially equal to the third cross-sectional diameter $D_3$; however, the two cross-sectional diameters do not need to be equal.

In addition to changing the size of the internal bore 209, the transitional sections 239, 240 can at least partially round off the intersection of a port and the bore 209. Therefore, while the change in size of the internal bore 209 may not be necessary in all embodiments, the transitional sections 239, 240 can eliminate the sharp, 90° intersections typically associated with the intersection of the port and the bore 209. For example, the left side of the intersection of the port 108a and the internal bore 209 is at least partially rounded off or dulled. Likewise, the right side of the intersection of the port 107b and the internal bore 209 is at least partially rounded off. The rounded off corners can reduce the likelihood of damage being done to the seals as the rotatable spool 210 is inserted into the housing 104. For example, if the right side of the port 107b comprised a sharp corner, a first canted seal 217 could be damaged and possible rendered inoperable as the spool 210 is being inserted into the first housing portion 204a. Likewise, as the second housing portion 204b is put into place over the spool 210, a sharp left side of the port 108a could damage a second canted seal member 218. Consequently, the transition sections 239, 240 can reduce potential damage to the sealing members as the valve 103 is being assembled and/or actuated between the opened and closed position.

According to an embodiment, the changes in the internal diameters of the bore 209 as well as the transitional section 239, 240 may be formed as part of an initial molding process. Alternatively, the changes can be machined into a substantially constant sized internal bore. Those skilled in the art will readily recognize suitable methods for forming the various cross-sectional diameters $D_1$-$D_3$ as well as the transitional sections 239, 240.

According to an embodiment, the rotatable spool 210 can be coupled to the handle 105 via a bolt 211 or some other fastening device. Alternatively, the handle 105 may be coupled to the rotatable spool 210 by brazing, bonding, adhesives, etc. The particular method used to couple the handle 105 to the rotatable spool 210 is not important for the present embodiment.

According to the embodiment shown, the rotatable spool 210 is positioned to rotate within the housing 104 along a plurality of sealing members 212, 213 about a longitudinal axis X-X. However, while the spool 210 can rotate within the housing 104, as can be seen, the rotatable spool 210 is substantially prevented from moving within the housing 104 in a direction parallel to the longitudinal axis X-X. The sealing members 212, 213 may comprise 0-rings or the like. As shown, the sealing members 212, 213 are substantially perpendicular to the longitudinal axis X-X and thus, perpendicular to the spool's rotational axis.

According to an embodiment, the valve 103 further comprises two or more canted seals 217, 218. According to an embodiment, the canted seals 217, 218 can simply be positioned around the rotatable spool 210 and held in place by a friction fit. According to another embodiment, the canted seals 217, 218 can be positioned around the rotatable spool 210 and additionally coupled to the rotatable spool 210 and held in place according to other means, such as adhesives, bonding, etc. Unlike the sealing members 212, 213 that are substantially perpendicular to the longitudinal axis X-X, the canted seals 217, 218 are provided at an angle with respect to the spool's longitudinal axis X-X, and thus, the spool's axis of rotation. In the embodiment shown, the first canted seal 217 is at an angle $\theta$ with respect to the longitudinal axis X-X while the second canted seal 218 is at an angle $\alpha$ with respect to the longitudinal axis X-X. In the embodiment shown, the angles $\alpha$ and $\theta$ comprise substantially the same angle. However, in other embodiments, the seals 217, 218 may be at different angles. According to an embodiment, the angles $\theta$ and $\alpha$ vary between approximately 5°-55°. In the embodiment shown, the angles θ and α are at approximately 35° with respect to the longitudinal axis X-X. Those skilled in the art will readily recognize suitable alternative angles. For example, the angles θ and α may depend upon the positioning of the fluid ports; however, the canted seals 217, 218 will be at an angle that is less than 90° with respect to the longitudinal axis X-X.

The seals 217, 218 may be canted with respect to the longitudinal axis X-X by providing grooves 219, 220, which are canted and positioning the seals 217, 218 within the canted grooves 219, 220, for example. In such embodiments, the seals 217, 218 can simply comprise 0-rings positioned within the canted grooves 219, 220.

According to the embodiment shown, the canted seals 217, 218 allow the valve 103 to selectively open and close fluid communication paths between the first set of fluid ports 107a, 107b and the second set of fluid ports 108a, 108b substantially simultaneously. Although the fluid ports 107a, 107b, 108a, 108b are described as controlling an engine coolant between a vehicle's engine cooling circuit 101 and a heater 102, it should be appreciated, that the valve 103 may be utilized in other applications and therefore, the valve 103 may control the flow of fluids other than engine coolants. Therefore, the valve 103 should in no way be limited to the specific example provided. Rather, the valve 103 is described as being utilized in a vehicle's heating system 100 merely to aid the reader in appreciating one specific use of the valve 103.

In FIG. 2, the rotatable spool 210 is actuated to a first position. In the first position, the canted seals 217, 218 are oriented with respect to the fluid ports to allow fluid communication between the first and second fluid ports 107a, 107b and between the third and fourth fluid ports 108a, 108b. As shown, the first and second fluid ports 107a, 107b are in fluid communication with one another via a first fluid chamber 227. The first fluid chamber 227 is defined by the rotatable spool 210 and the housing 104. Fluid is retained within the first fluid chamber 227 and prevented from leaking to other areas of the housing 104 by the sealing member 212 and the sealing member 213. According to an embodiment, in the first position, the entire first canted seal 217 does not form a substantially fluid-tight seal with the internal bore 209. As shown, a portion of the first canted seal 217 is positioned in an area of the internal bore 209 comprising the second cross-sectional diameter $D_2$. The second cross-sectional diameter $D_2$ may be large enough that the portion of the canted seal 217 received in the second cross-sectional diameter $D_2$ is not compressed to form a fluid-tight seal with the internal bore 209. Consequently, in the embodiment shown, only the lower portion of the canted seal 217 to the right of the transition section 240 is compressed to form a fluid-tight seal. As a result, fluid can escape past the canted seal member 217, but is substantially prevented from passing the sealing member 212. Therefore, the fluid entering the fluid chamber 227 from the first fluid port 107a is directed out of the fluid chamber 227 towards the second fluid port 107b.

According to an embodiment, when the rotatable spool 210 is in the first position, the third and fourth fluid ports 108a, 108b are also in fluid communication with one another via a second fluid chamber 228. The second fluid chamber 228 is defined by the rotatable spool 210 and the housing 204b. Fluid is prevented from escaping to other areas of the housing 104 by the sealing members 212, 214, 215. Like the first canted seal 217, in the first position, a portion of the second canted seal 218 is positioned in the portion of the internal bore 209 comprising the second cross-sectional diameter $D_2$. Therefore, in the first position, only a portion of the second canted seal 218 forms a substantially fluid-tight seal with the internal bore 209. Specifically, in the embodiment shown, the portion of the second canted seal 218 received in the first cross-sectional diameter $D_1$ of the internal bore 209 is compressed to form a substantially fluid-tight seal while the portion of the second canted seal 218 received in the second cross-sectional diameter $D_2$ of the internal bore 209 does not necessarily form a fluid-tight seal. Therefore, in the first position, fluid can flow past at least a portion of the second canted seal 218, but is prevented from flowing past the sealing member 212.

Figure 4:
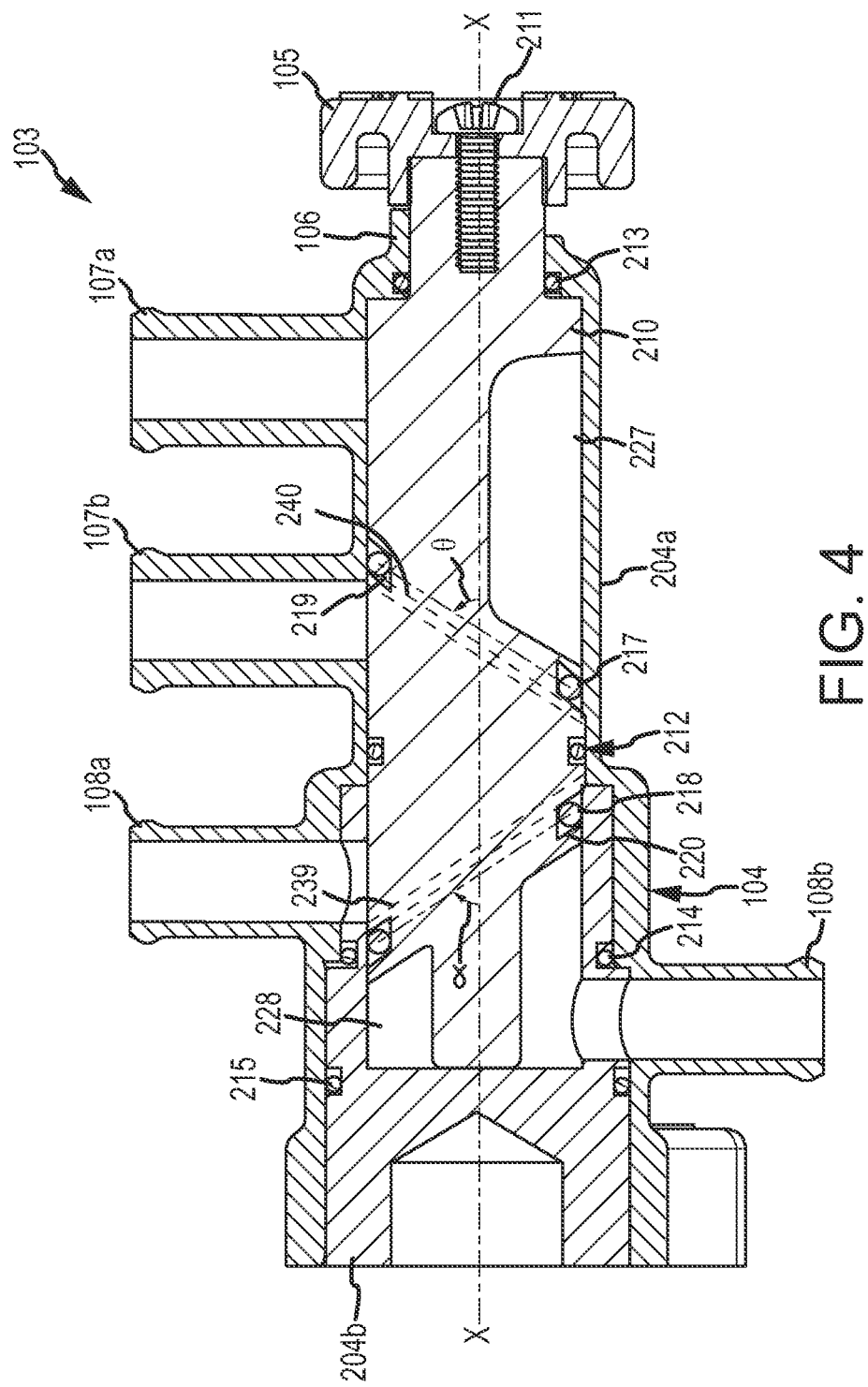
FIG. 4 shows a cross-sectional view of the valve in a second position according to another embodiment.

Further shown in FIG. 2 are first and second tabs 206. A first tab 206 is shown extending slightly above the handle stop 106 with the portion behind the handle stop 106 being shown by dashed lines. The first tab 206 can abut the handle stop 106 when the handle 105 and thus, the rotatable spool 210 are rotated to a first position. The first tab 206 therefore prevents the handle 105 from being over-rotated. The second tab 206 shown at the bottom of the handle 105 in FIG. 2 abuts the handle stop 106 when the handle 105 and thus, the rotatable spool 210 are actuated to a second position, which is shown in FIG. 4. The stop 106 along with the tabs 206 ensure that a user or operator does not over-rotate the valve 103 resulting in a small fluid passageway being unintentionally created when it is desired to completely close off the fluid ports. Likewise, the stops can ensure that the valve is fully open when desired. Therefore, the user or operator simply needs to rotate the handle 105 in the desired direction until a tab 206 abuts the stop 106 to ensure the valve 103 is either fully open or fully closed.

It should be appreciated that while the presently described embodiment utilizes a stop 106 and tabs 206 to limit the rotation of the spool 210, in other embodiments, the rotational limits may be formed within the housing and contact the rotational spool 210 directly. Therefore, those skilled in the art will recognize alternative methods for limiting the rotation of the rotatable spool 210.

Figure 3:
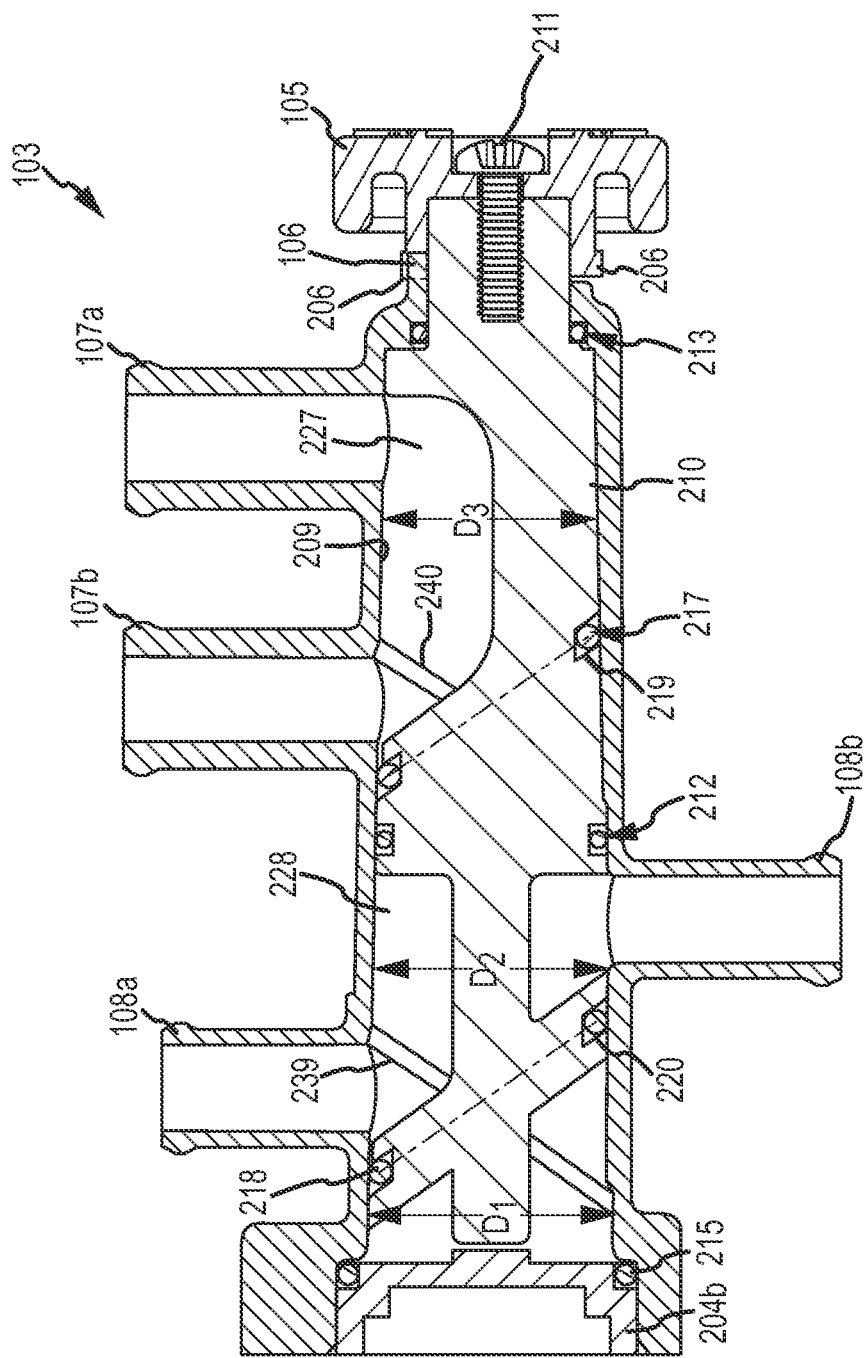
FIG. 3 shows a cross-sectional view of the valve in a first position according to another embodiment.

FIG. 3 shows a cross-sectional view of the valve 103 in the first position according to another embodiment. In the embodiment shown in FIG. 3, the position of the fourth fluid port 108b has moved slightly towards the center of the valve 103. Further, while the second canted seal 218 seals against the second housing portion 204b in the embodiment shown in FIG. 2, both of the canted seals 217, 218 seal against the first housing portion 204a in the embodiment shown in FIG. 3. Therefore, the second housing portion 204b can comprise an end to retain the rotatable spool 210 within the internal bore 209.

Another difference between the embodiment shown in FIG. 2 compared to the embodiment shown in FIG. 3 is the transition of the cross-sectional diameters of the internal bore 209. According to the embodiment shown in FIG. 3, starting on the left of the figure, the internal bore 209 comprises a first cross-sectional diameter $D_1$. A first transition section 239 decreases the size of the internal bore 209 from the first cross-sectional diameter $D_1$ to a second cross-sectional diameter $D_2$ from left to right. A second transition section 240 can then decrease the internal bore 209 from the second cross-sectional diameter $D_2$ to a third cross-sectional diameter $D_3$ from left to right. Therefore, in the embodiment shown in FIG. 3, $D_1 > D_2 > D_3$.

As described above, the transitional sections 239, 240 can also at least partially round the intersection of a port and the internal bore 209. Therefore, in the embodiment shown in FIG. 3, the first transitional section 239 can at least partially round off the right side of the intersection between the port 108a and the internal bore while the second transitional section 240 can at least partially round off the right side of the intersection between the port 107b and the internal bore 209.

Therefore, with the rounded off portions being on the right of the port/internal bore intersection, the canted seals 217, 218 are substantially prevented from damage as the spool 210 is inserted into the bore 209 from the left of FIG. 3 to the right as well as during actuation of the spool 210. As is generally known in the art, the canted seal members 217, 218 will generally not be damaged crossing over the potentially sharp corners of the left of the port/bore intersection as the likelihood of the sealing member being caught on the sharp corner is minimal as the spool 210 is being inserted.

FIG. 4 shows a cross-sectional view of the valve 103 with the rotatable spool 210 rotated to a second position. FIG. 4 shows the embodiment depicted in FIG. 2 where the second canted seal 218 is positioned within the second housing portion 204b. However, those skilled in the art can readily appreciated how the below discussion would apply to the embodiment shown in FIG. 3. According to the embodiment shown, in the second position, the first and second fluid ports 107a, 107b are closed off from one another by the first canted seal 217. Therefore, according to an embodiment, the entire first canted seal 217 can be positioned within the portion of the internal bore 209 comprising the third cross-sectional diameter $D_3$. This can be made possible by forming the transitional section 240 at approximately the same angle with respect to the longitudinal axis X-X as the first canted seal 217. Therefore, as the spool 210 is actuated to the second position, the entire first canted seal 217 can be positioned to the right (as shown in the figures) of the transitional section 240 to be positioned within the portion of the internal bore 209 comprising the third cross-sectional diameter $D_3$. Similarly, the third and fourth fluid ports 108a, 108b are closed off from one another by the second canted seal 218. Therefore, according to an embodiment, the entire second canted seal 218 can be located within the portion of the internal bore 209 comprising the first cross-sectional diameter $D_1$. In a similar manner to the transitional section 240, the transitional section 239 can be formed at approximately the same angle as the canted seal 218 to allow the entire canted seal 218 to be positioned within the section of the internal bore 209 comprising the first cross-sectional diameter $D_1$. As can be seen, the first fluid chamber 227 is no longer in fluid communication with the second fluid port 107b. Rather, the canted seal 217 forms a substantially fluid-tight seal to block the second fluid port 107b from communicating with the first fluid chamber 227 and thus, the first fluid port 107a. Consequently, in the embodiment shown, when the rotatable spool 210 is in the second position, the fluid from the first fluid port 107a is isolated from the second fluid port 107b.

Additionally, when the rotatable spool 217 is in the second position, the third fluid port 108a is no longer in fluid communication with the second fluid chamber 228. Rather, the canted seal 218 forms a substantially fluid-tight seal to block the third fluid port 108a from communicating with the second fluid chamber 228 and thus, the fourth fluid port 108b.

In the above described embodiments the fluid communication between the first and second ports 107a, 107b and between the third and fourth fluid ports 108a, 108b is described as being closed off when the rotatable spool 210 is in the second position. However, in other embodiments, one set of fluid ports may be in fluid communication while the other set of ports are closed off from one another. For example, while the canted seals 217, 218 are currently angled in opposite directions (in the embodiments shown in FIGS. 2 & 4), in another embodiment, the canted seal 217 can be angled in the same direction as the canted seal 218. In such a configuration, the first and second fluid ports 107a, 107b would be sealed off from one another when the rotatable spool 210 was in the first position while the third and fourth fluid ports 108a, 108b would be in fluid communication with one another as described above. Conversely, the first and second fluid ports 107a, 107b would be in fluid communication with one another when the rotatable spool 210 was in the second position while the third and fourth fluid ports 108a, 108b would be closed off from one another as shown. As can be appreciated, such a configuration would also require that one of the fluid chambers 227, 228 be rotated approximately 180° around the rotatable spool 210. Therefore, while the canted seals 217, 218 allow communication between two sets of fluid ports to be controlled substantially simultaneously upon rotation of the rotatable spool 210, the sets of ports do not need to be configured to open and close at the same position.

The embodiments described above provides an improved rotatable spool valve capable of simultaneously providing and/or closing fluid communication between two fluid port sets. The improvement in the valve 103 is attributable to the canted seals 217, 218, which open or close a fluid communication path between fluid ports based on an actuated position. Advantageously, simple rotation of the rotatable spool 210 can easily actuate multiple fluid ports.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other valves, and not just to the embodiments described above and shown in the accompanying figures. Accordingly, the scope of the embodiments described above should be determined from the following claims.

I claim:

1. A valve (103), comprising:
    a housing (104) defining an internal bore (209) and plurality of fluid ports (107a, 107b, 108a, 108b);
    a rotatable spool (210) positioned within the internal bore (209) and rotatable about a longitudinal axis (X-X) wherein the internal bore (209) comprises three or more cross-sectional diameters (D1, D2, D3), and wherein the entire first canted seal (217) is positioned within a portion of the internal bore (209) comprising a single cross-sectional diameter when the first fluid port (107a) is sealed off from the second fluid port (107b) and wherein the entire second canted seal (218) is positioned within a portion of the internal bore (209) comprising a single cross-sectional diameter when the third fluid port (108a) is sealed off from the fourth fluid port (108b) and wherein transitional sections between the cross-sectional diameters (D1, D2, D3) are at least partially rounded off at an intersection of a port and the internal bore (209);
    a first canted seal (217) positioned on the rotatable spool (210) at an angle (e) with respect to the longitudinal axis (X-X); and a second canted seal (218) positioned on the rotatable spool (210) at an angle (~) with respect to the longitudinal axis (X-X).

2. The valve (103) of claim 1, wherein the first canted seal (217) is positioned to selectively seal a first fluid port (107*a*) off from a second fluid port (107*b*) and wherein the second canted seal (218) is positioned to selectively seal a third fluid port (108*a*) off from a fourth fluid port (108*b*).

3. The valve (103) of claim 1, wherein the angle (θ) of the first canted seal (217) is between approximately 5° and approximately 55°.

4. The valve (103) of claim 1, wherein the angle (α) of the second canted seal (217) is between approximately 5° and approximately 55°.

5. The valve (103) of claim 1, further comprising a handle (105) coupled to a portion of the rotatable spool (210) extending from the housing (104).

6. The valve (103) of claim 4, wherein the handle (105) comprises one or more tabs (206) sized and positioned to contact a handle stop (106) extending from the housing (106) when the rotatable spool (210) is in one or more predetermined positions.

7. The valve (103) of claim 1, further comprising a first fluid chamber (227) in fluid communication with a first fluid port (107*a*) and a second fluid port (107*b*) when the rotatable spool (210) is in a first position.

8. The valve (103) of claim 1, further comprising a second fluid chamber (228) in fluid communication with a third fluid port (108*a*) and a fourth fluid port (108*b*) when the rotatable spool (210) is in a first position.

9. A method for forming a valve, comprising steps of:
positioning a first canted seal on a spool at a first angle with respect to a longitudinal axis of the spool;
positioning a second canted seal on the spool at a second angle with respect to the longitudinal axis of the spool; and
positioning the spool in a housing such that the spool can rotate within the housing about the longitudinal axis to selectively control a fluid flow through a plurality of fluid ports using the first and second canted seals, wherein:
the step of positioning the spool comprises inserting the spool into an internal bore formed by the housing that comprises three or more cross-sectional diameters; and
wherein transitional sections between the cross-sectional diameters at least partially round off at an intersection of a port and the internal bore.

10. The method of claim 9, wherein the step of positioning the spool comprises positioning the spool to selectively seal a first fluid port off from a second fluid port with the first canted seal and selectively seal a third fluid port off from a fourth fluid port with the second canted seal.

11. The method of claim 9, wherein the angle of the first canted seal is between approximately 5° and approximately 55°.

12. The method of claim 9, wherein the angle of the second canted seal is between approximately 5° and approximately 55°.

13. The method of claim 9, further comprising a step of coupling a handle to a portion of the spool that extends from the housing.

14. The method of claim 13, further comprising a step of forming one or more tabs on the handle that are sized and positioned to contact a handle stop extending from the housing when the spool is in one more predetermined positions.

15. A method for controlling a fluid through a valve, comprising a step of:
rotating a rotatable spool about a longitudinal axis to a first position to selectively control a fluid flow through a first and a second fluid port with a first canted seal positioned on the rotatable spool at a first angle with respect to the longitudinal axis and to selectively control a fluid flow through a third fluid port and a fourth fluid port with a second canted seal positioned on the rotatable spool at a second angle, different from the first angle, with respect to the longitudinal axis, wherein the first fluid port exclusively fluidly communicates with the second fluid port, wherein the third fluid port exclusively fluidly communicates with the fourth fluid port, and wherein the first canted seal opens a fluid flow path between the first and second fluid ports when the rotatable spool is in the first position and wherein the second canted seal opens a fluid flow path between the third and fourth fluid ports when the rotatable spool is in the first position; and
rotating the rotatable spool to a second position to close the fluid flow path between the first and second fluid ports and to close the fluid flow path between the third fluid and fourth fluid ports.

16. The valve (103) of claim 1, wherein the angle (θ) is approximately 90° to the angle (α).

17. The method of claim 9, wherein the first angle is approximately 90° to the second angle.

18. The method for controlling a fluid through a valve of claim 15, wherein the first angle is approximately 90° to the second angle.

* * * * *